Figure 1:
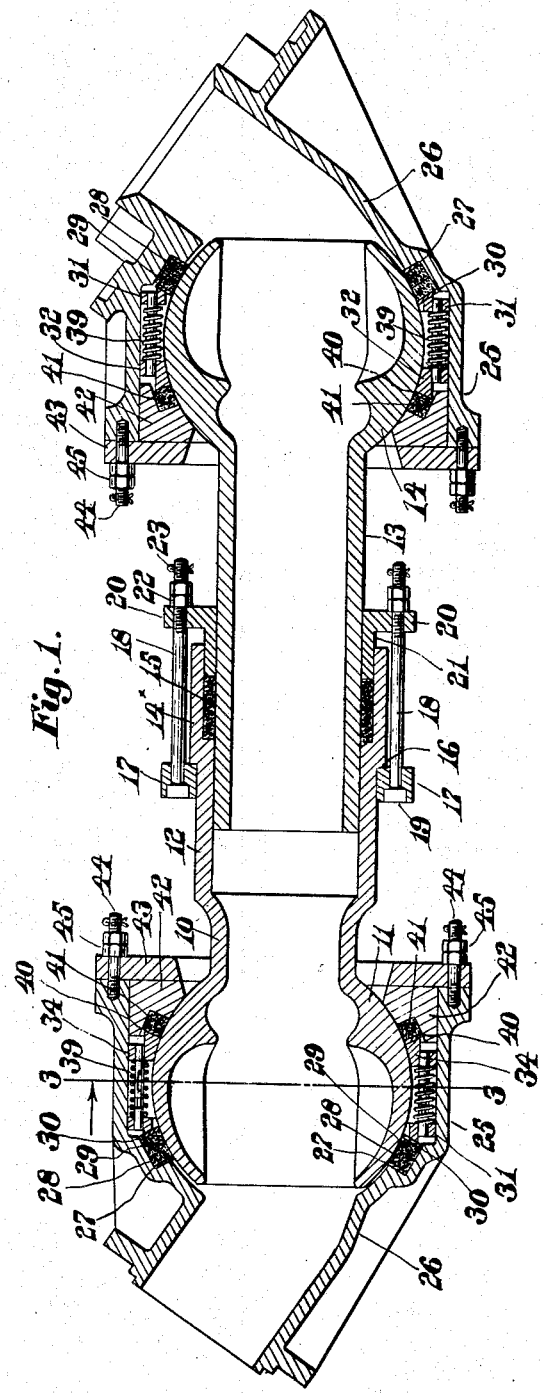

W. A. GREENLAW & R. A. JEWETT.
TRAIN PIPE CONNECTION.
APPLICATION FILED JAN. 25, 1911.

1,015,435.

Patented Jan. 23, 1912.

2 SHEETS—SHEET 1.

Witnesses:
Nathan C. Lombard
Mary C. Smith

Inventors:
Warren A. Greenlaw,
Robert A. Jewett,
by Walter C. Lombard, Atty.

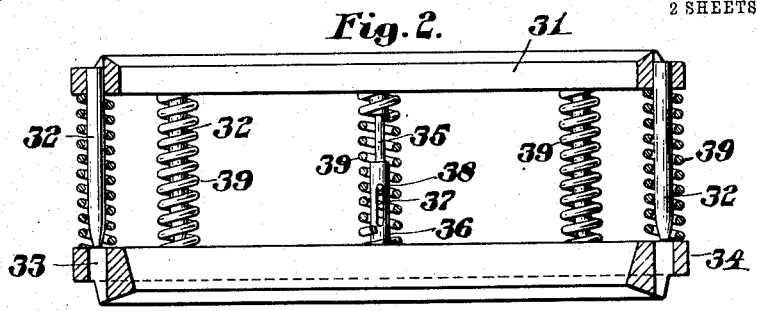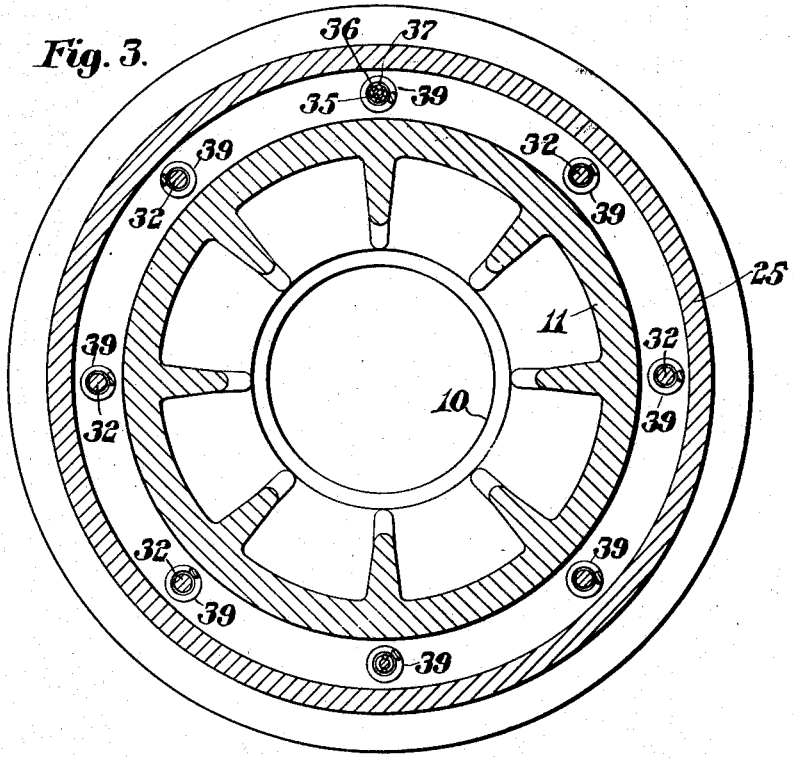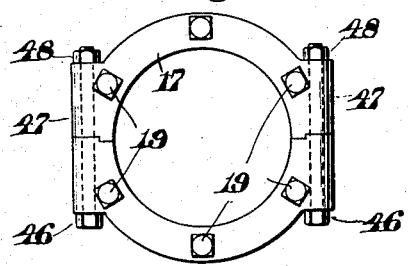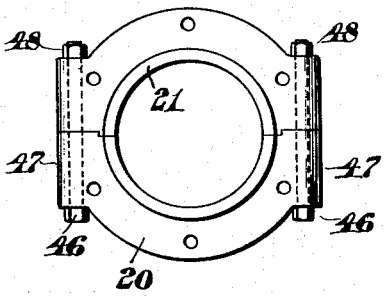

UNITED STATES PATENT OFFICE.

WARREN A. GREENLAW, OF MELROSE, AND ROBERT A. JEWETT, OF BOSTON, MASSACHUSETTS, ASSIGNORS TO THE GREENLAW MANUFACTURING CO., OF BOSTON, MASSACHUSETTS, A CORPORATION OF MAINE.

TRAIN-PIPE CONNECTION.

1,015,435.  Specification of Letters Patent.  Patented Jan. 23, 1912.

Application filed January 25, 1911. Serial No. 604,675.

*To all whom it may concern:*

Be it known that we, WARREN A. GREENLAW, a citizen of the United States of America, and a resident of Melrose, in the county of Middlesex and State of Massachusetts, and ROBERT A. JEWETT, a citizen of the United States of America, and a resident of Boston, in the county of Suffolk and State of Massachusetts, have invented certain new and useful Improvements in Train-Pipe Connections, of which the following is a specification.

This invention relates to flexible pipe connections and is particularly adapted for use on certain types of locomotives in which steam passes from one set of cylinders to another set, or from a re-heater to the low pressure cylinder in a locomotive of the Mallet type.

It has for its object the provision of two pipe members, one telescoping into the other, and provided with a suitable means for packing the joint between said pipe members, and each provided with a ball end positioned within a pipe section having confined therein spring pressed members for packing the joint between said ball ends and the interior of said pipe sections.

The invention consists in certain novel features of construction and arrangement of parts which can be readily understood by reference to the description of the drawings and to the claims hereinafter given.

Of the drawings: Figure 1 represents a section through a pipe connection embodying the features of the present invention. Fig. 2 represents a section through one of the spring pressed packing followers confined within each pipe section. Fig. 3 represents a transverse section, the cutting plane being on line 3—3 on Fig. 1, and Figs. 4 and 5 represent respectively the divided ring upon the outer pipe member and the divided follower ring upon the inner pipe member. Figs. 2 and 3 are drawn to an enlarged scale.

Similar characters designate like parts throughout the several figures of the drawings.

In the drawings, 10 represents a pipe member provided at one end with a ball portion 11, and at its opposite end with an enlarged cylindrical portion 12 adapted to receive the pipe member 13, having at its opposite end a ball portion 14. The end 12 is provided with a cup-shaped portion 14$^x$ containing the annular packing 15 surrounding the periphery of the pipe member 13. The periphery of the end 12 is provided with a shoulder 16 against which normally rests a ring 17 having a plurality of openings therein in which are mounted the headed bolts 18, the heads 19 of which are square and are positioned within square pockets in the ring 17 and are prevented thereby from turning. These bolts 18 extend through a plurality of openings in the follower ring 20, which is provided with an annular flange 21 bearing against the packing 15. The threaded ends of the bolts 18 have mounted thereon the nuts 22, by which the annular flange 21 may be forced sufficiently hard against the packing 15 as to thoroughly pack the joint between the two pipe members 10 and 13. The extreme outer ends of the bolts 18 are provided with cotter pins or other lateral members 23 which prevent the nuts 22 from accidental separation from said bolts. By this construction the pipe member 13 is permitted to move lengthwise of the pipe member 10 and allow for expansion and contraction of the two pipe members, or for jars and rocking incident to the rapid running of the locomotive.

Each of the ball members 11 and 14 is positioned within the cup-shaped end 25 of a pipe section 26. At the bottom of each cup-shaped end 25 is positioned a metal ring 27, upon which is superimposed the packing members 28 and 29, the packing member 29 in turn having positioned thereon a metal ring 30. Bearing against the ring 30 is a ring 31 having secured therein a plurality of pins 32 tapered at their outer ends and adapted to enter the openings 33 in a smaller ring 34. The ring 31 is also provided with a plurality of other pins 35 extending into tubular members 36 formed on or secured to the ring 34. Each tubular member 36 is provided with a slot 37 into which extends a projection 38 upon the pin 35, the object of these projections 38 being to prevent the separation of the two rings 31 and 34 when removed from the cup-shaped ends 25. Helical springs 39 are adapted to normally separate the rings 31 and 34, but owing to the connections between the pins 35 and the tubular member 36, the tapered pins 32 are always in alinement with the openings 33 through the ring 34. This makes a very convenient form of spring pressed packing follower, which is incapable of becoming dismembered when removed from the pipe sections 26.

Bearing against the end face of the ring 34 is a metal ring 40 normally resting against a packing ring 41 within an annular member 42, closing the outer end of the cup-shaped end 25. This annular member 42 is held in position by means of the end plate 43 secured to the cup-shaped end 25 of the pipe section 26 by means of the bolts 44 and nuts 45. The entire diameter of the ring 31 is such as to permit this ring to pass over the greatest diameter of the ball end 11 or 14. When the various members are to be installed, the rings 27 and 30, with the packing members 28 and 29 interposed between them are placed within suitable seats at the inner end of the cup-shaped member 25. The spring pressed followers 31 and 34 are then inserted within the cup-shaped end 25, passing over the smaller ends of the pipe members 10 and 13 respectively. The annular member 42 with the packing 41 seated therein, and covered by the ring 40 is then similarly inserted within the cup-shaped member 25 and the closing plate 43, passed over the smaller ends of the pipe members 10 and 13, is secured to the cup-shaped end 25. The springs 39 will now act upon the rings 31 and 34 to separate them and force the packing members 28, 29, and 41 into firm contact with the periphery of the ball ends 11 and 14, thereby effectively packing the joint between the pipe sections 26 and said ball ends, thus preventing any leakage of steam or other fluid from the complete pipe connection. When these various members have been positioned in the order mentioned, the pipe member 13 is inserted within the enlarged end 12 of the pipe member 10 and the rings 17 and 20 are placed in position and locked together by means of the bolts 18 and the nuts 22 threaded thereto, the annular flange 21 being pressed firmly into contact with the packing 15 so as to force it into contact with the periphery of the pipe member 13 and effectively pack the joint between the two telescoping pipe members. In order to place these rings 17 and 20 upon the pipe members 10 and 13 after the ball ends thereof have been inserted in the cup-shaped ends 25, and the outer end of the pipe member 13 has been inserted in the enlarged end 12 of the pipe member 10, each of these rings is divided as indicated in Figs. 4 and 5, and secured together by suitable bolts 46 extending through ears 47 formed upon each of the parts of the said rings, and having nuts 48 threaded to the opposite ends thereof.

This makes a very effective pipe connection adapted for the use specified in which two pipe members are adapted to telescope to allow for contraction and expansion of the metal when in use, and to further permit one pipe member to slip on the other when the various elements are jarred or rocked by the travel of the locomotive. Moreover, the ball portions on the ends of said pipe members are so positioned within the cup-shaped portions that the pipe sections are free to move within certain limits about the center of said ball portions to permit the connection to accommodate itself to the different positions the various elements may assume under varying conditions.

It is believed that the operation and many advantages of this invention will be thoroughly understood from the foregoing.

Having thus described our invention, we claim:

1. In a device of the class described, the combination of a pipe member having a ball end; a pipe section provided with a cup-shaped end adapted to receive said ball; annular packing members in said cup-shaped end; and means interposed between said packing members adapted to force them into contact with the surface of said ball.

2. In a device of the class described, the combination of a pipe member having a ball end; a pipe section provided with a cup-shaped end adapted to receive said ball; annular packing members in said cup-shaped end; and a spring pressed separator interposed between said packing members adapted to force them into contact with the surface of said ball.

3. In a device of the class described, the combination of a pipe member having a ball end; a pipe section provided with a cup-shaped end adapted to receive said ball; annular packing members in said cup-shaped end; and a spring pressed separator interposed between said packing members adapted to force them into contact with the surface of said ball; said separator including means to prevent the complete separation thereof when removed from said cup-shaped end.

4. In a device of the class described, the combination of a pipe member having a ball end; a pipe section provided with a cup-shaped end adapted to receive said ball; annular packing members in said cup-shaped end; rings bearing against said packing members; centering pins on one ring extending through openings in the other; and springs surrounding said pins.

5. In a device of the class described, the combination of a pipe member having a ball end; a pipe section provided with a cup-shaped end adapted to receive said ball; annular packing members in said cup-shaped end; rings bearing against said packing members; centering pins on one ring extending through openings in the other; springs surrounding said pins; a pair of tubular members on one of said rings; male members on the other ring extending into said tubular members; and means for limiting the movement of said male members in said tubular members.

6. In a device of the class described, the combination of a pipe member having a ball end; a pipe section provided with a cup-shaped end adapted to receive said ball; annular packing members in said cup-shaped end; rings bearing against said packing members; centering pins on one ring extending through openings in the other; springs surrounding said pins; a pair of slotted tubular members on one of said rings; male members on the other ring extending into said tubular members; and pins in said slots and extending through said male members for limiting the movement of said male members in said tubular members.

Signed by us at 4 Post Office Sq., Boston, Mass., this 24th day of January, 1911.

WARREN A. GREENLAW.
ROBERT A. JEWETT.

Witnesses:
NATHAN C. LOMBARD,
MARY C. SMITH.